United States Patent
Miyata et al.

(10) Patent No.: US 10,267,696 B2
(45) Date of Patent: Apr. 23, 2019

(54) BELT TENSION CALCULATING PROGRAM, BELT NATURAL FREQUENCY CALCULATING PROGRAM, METHOD AND DEVICE FOR CALCULATING BELT TENSION, AND METHOD AND DEVICE FOR CALCULATING BELT NATURAL FREQUENCY

(71) Applicant: BANDO CHEMICAL INDUSTRIES, LTD., Kobe-shi (JP)

(72) Inventors: Hirofumi Miyata, Kobe (JP); Yoshikazu Wakizaka, Kobe (JP); Yasushi Chida, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 244 days.

(21) Appl. No.: 14/699,286

(22) Filed: Apr. 29, 2015

(65) Prior Publication Data
US 2015/0247769 A1   Sep. 3, 2015

Related U.S. Application Data

(63) Continuation of application No. PCT/JP2013/006191, filed on Oct. 18, 2013.

(30) Foreign Application Priority Data

Oct. 29, 2012   (JP) .................................. 2012-237979

(51) Int. Cl.
*G01L 5/04*      (2006.01)
*G01H 13/00*   (2006.01)
*F16H 57/01*   (2012.01)

(52) U.S. Cl.
CPC .............. *G01L 5/042* (2013.01); *F16H 57/01* (2013.01); *G01H 13/00* (2013.01)

(58) Field of Classification Search
CPC .......... G01L 5/042; G01H 13/00; F16H 57/01
See application file for complete search history.

(56) References Cited

U.S. PATENT DOCUMENTS

| 3,871,217 A | 3/1975 | Miley |
| 4,928,538 A * | 5/1990 | Burdess ................ G01L 5/042 73/862.41 |

(Continued)

FOREIGN PATENT DOCUMENTS

| CN | 202350966 U | 7/2012 |
| CN | 102735386 A | 10/2012 |

(Continued)

OTHER PUBLICATIONS

Serge Abrate, "Vibrations of Belts and Belt Drives", Mech. Mach. Theory, vol. 27, No. 6, pp. 645-659, 1992, XP55281130A.

(Continued)

*Primary Examiner* — Nikolay K Yushin
(74) *Attorney, Agent, or Firm* — Renner Otto Boisselle & Sklar, LLP (57) ABSTRACT

A more accurate tension of a belt or a more accurate target natural frequency of the belt when the belt tension is adjusted is determined. A method for calculating a belt tension includes receiving a natural frequency of a belt and a span; performing calculation for determining a tension of the belt using a predetermined expression, based on the natural frequency, the span, and a unit mass of the belt read from a memory; and displaying the tension on a display, wherein in a case where the span is within a predetermined range corresponding to the belt, the predetermined expression is corrected so that an error caused by a bending stiffness of the belt is reduced.

12 Claims, 6 Drawing Sheets

(56) References Cited

U.S. PATENT DOCUMENTS

| | | | |
|---|---|---|---|
| 5,698,796 A * | 12/1997 | Hirano | G01L 5/042 |
| | | | 73/160 |
| 5,877,431 A | 3/1999 | Hirano | |
| 6,789,035 B1 | 9/2004 | Hashimoto | |
| 7,185,546 B2 * | 3/2007 | Le | G01L 5/042 |
| | | | 73/801 |
| 2003/0033864 A1 | 2/2003 | Rankin | |
| 2004/0066521 A1 * | 4/2004 | Swab | G01L 5/042 |
| | | | 356/614 |
| 2008/0004751 A1 | 1/2008 | Chung | |
| 2014/0096608 A1 | 4/2014 | Themm et al. | |

FOREIGN PATENT DOCUMENTS

| | | |
|---|---|---|
| JP | 59-196449 A | 11/1984 |
| JP | 62-261937 A | 11/1987 |
| JP | 62-278352 | 12/1987 |
| JP | 02-190727 A | 7/1990 |
| JP | H06-137932 A | 5/1994 |
| JP | 08-015063 A | 1/1996 |
| JP | 08-110276 A | 4/1996 |
| JP | 08-292111 A | 11/1996 |
| JP | 09-101289 A | 4/1997 |
| JP | 2002-131156 A | 5/2002 |
| JP | 2002-372112 A | 12/2002 |
| JP | 2005-257350 A | 9/2005 |
| JP | 2010-230443 A | 10/2010 |

OTHER PUBLICATIONS

Abdullah et al., "Effect of Transducer Mass on Thin Plate Vibration", IEEE, 2008, XP31326043A.

Co-pending U.S. Appl. No. 14/736,360, filed Jun. 11, 2015 (application provided).

Bruel & Kjaer: "Measuring Vibration", Brochure, Sep. 1982, XP055356419, Retrieved from the Internet, URL: https://www.bksv.com/media/doc/br0094.pdf.

* cited by examiner

BELT TENSION CALCULATING PROGRAM, BELT NATURAL FREQUENCY CALCULATING PROGRAM, METHOD AND DEVICE FOR CALCULATING BELT TENSION, AND METHOD AND DEVICE FOR CALCULATING BELT NATURAL FREQUENCY

CROSS-REFERENCE TO RELATED APPLICATIONS

This is a continuation of International Application No. PCT/JP2013/006191 filed on Oct. 18, 2013, which claims priority to Japanese Patent Application No. 2012-237979 filed on Oct. 29, 2012. The entire disclosures of these applications are incorporated by reference herein.

BACKGROUND

The present disclosure relates to techniques for calculating the tension of a belt and for calculating the natural frequency of the belt for tensioning the belt.

To prevent wear in a belt looped over pulleys and other components and a reduction in transmission efficiency of the belt, the belt needs to keep having an appropriate tension. Thus, the tension of the belt needs to be measured. In a known technique, the tension of a belt is measured based on the natural frequency (the frequency of natural vibration) of the belt to enable simple measurement of the tension. For example, Japanese Unexamined Patent Publication No. 2005-257350 describes a device that includes a microphone used to detect vibrations of a belt through sound waves and calculates the tension in accordance with a predetermined expression.

SUMMARY

Unfortunately, the device of Patent Document 1, which detects vibrations of the belt through sound waves, is sometimes affected by ambient noise. To address this problem, if the natural frequency of the belt is measured by another process, the tension would need to be determined. The actually measured natural frequency has an error caused by the bending stiffness of the belt. Thus, a more accurate belt tension needs to be determined by considering the error. Meanwhile, adjusting the natural frequency of the belt appropriately allows the belt tension setup to be performed. Also in this case, a more accurate target natural frequency corresponding to a target tension needs to be determined by similarly considering the error.

It is an object of the present invention to determine a more accurate tension of a belt or to determine a more accurate target natural frequency of the belt when the belt tension is adjusted.

A non-transitory computer-readable storage medium, according to an embodiment of the present invention, contains instructions which, when executed by one or more processors, performs a method for calculating a belt tension. The method includes receiving a natural frequency of a belt and a span; performing calculation for determining a tension of the belt using a predetermined expression, based on the natural frequency, the span, and a unit mass of the belt read from a memory; and displaying the tension on a display, wherein in a case where the span is within a predetermined range corresponding to the belt, the predetermined expression is corrected so that an error caused by a bending stiffness of the belt is reduced.

With this configuration, the belt natural frequency is received to determine the tension. Thus, the belt tension can be determined independently of a process for measuring the natural frequency. The correction is performed so that the error caused by the belt bending stiffness is reduced, and then the tension is determined. This enables the determination of a more accurate tension.

A non-transitory computer-readable storage medium, according to an embodiment of the present invention, contains instructions which, when executed by one or more processors, performs a method for calculating a belt natural frequency. The method includes receiving a target tension of a belt and a span; performing calculation for determining a target natural frequency of the belt using a predetermined expression, based on the target tension, the span, and a unit mass of the belt read from a memory; and displaying the target natural frequency on a display, wherein in a case where the span is within a predetermined range corresponding to the belt, the predetermined expression is corrected so that an error caused by a bending stiffness of the belt is reduced.

A method for calculating a belt tension according to an embodiment of the present invention includes: receiving a natural frequency of a belt and a span; performing calculation for determining a tension of the belt using a predetermined expression, based on the natural frequency, the span, and a unit mass of the belt read from a memory; and displaying the tension on a display. In a case where the span is within a predetermined range corresponding to the belt, the predetermined expression is corrected so that an error caused by a bending stiffness of the belt is reduced.

A method for calculating a belt natural frequency according to an embodiment of the present invention includes: receiving a target tension of a belt and a span; performing calculation for determining a target natural frequency of the belt using a predetermined expression, based on the target tension, the span, and a unit mass of the belt read from a memory; and displaying the target natural frequency on a display. In a case where the span is within a predetermined range corresponding to the belt, the predetermined expression is corrected so that an error caused by a bending stiffness of the belt is reduced.

An device for calculating a belt tension according to an embodiment of the present invention includes: an input device configured to receive a natural frequency of a belt and a span; a memory configured to store a unit mass of the belt; a processor configured to perform calculation for determining a tension of the belt using a predetermined expression, based on the natural frequency, the span, and the unit mass of the belt read from the memory; and a display configured to display the tension. In a case where the span is within a predetermined range corresponding to the belt, the predetermined expression is corrected so that an error caused by a bending stiffness of the belt is reduced.

An device for calculating a belt natural frequency according to an embodiment of the present invention includes: an input device configured to receive a target tension of a belt and a span; a memory configured to store a unit mass of the belt; a processor configured to perform calculation for determining a target natural frequency of the belt using a predetermined expression, based on the target tension, the span, and the unit mass of the belt read from the memory; and a display configured to display the target natural frequency. In a case where the span is within a predetermined range corresponding to the belt, the predetermined expression is corrected so that an error caused by a bending stiffness of the belt is reduced.

The embodiment of the present invention enables the determination of the tension of the belt or the target natural frequency of the belt independently of the process for measuring the natural frequency. A more accurate belt tension, for example, is determined, because the error caused by the belt bending stiffness is considered.

DETAILED DESCRIPTION

An embodiment of the present invention will now be described with reference to the drawings.

Figure 1:
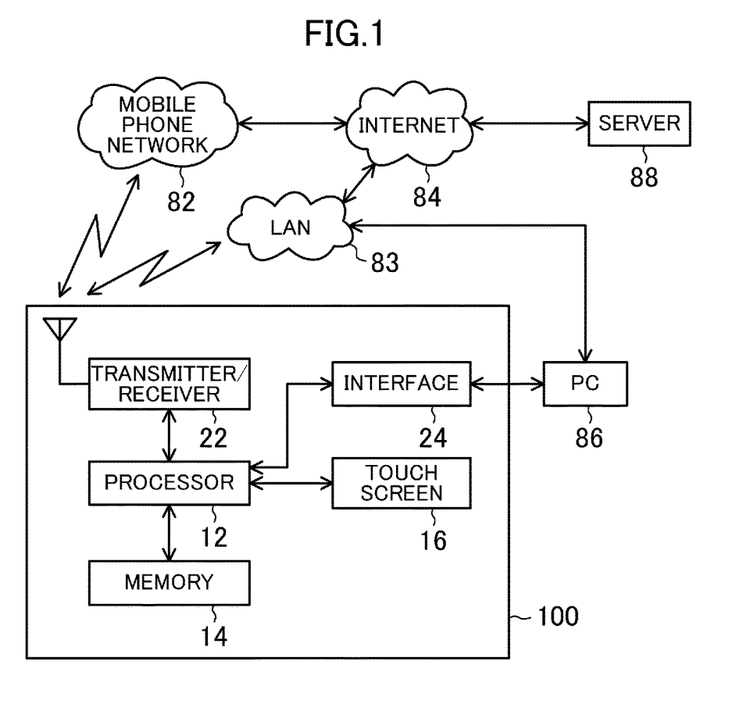
FIG. 1 is a block diagram illustrating an example of the configuration of a calculator according to an embodiment of the present invention.
Figure 2:
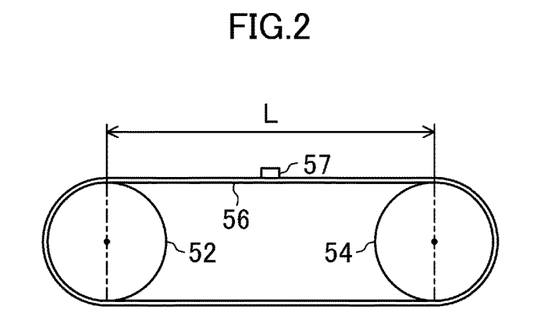
FIG. 2 illustrates an example of a target belt for, for example, measurement.

FIG. 1 is a block diagram illustrating an example of the configuration of a calculator according to the embodiment of the present invention. FIG. 2 illustrates an example of a target belt for, for example, measurement. A target belt 56 for, for example, measurement is looped between pulleys 52 and 54. For example, a three-dimensional acceleration sensor 57 is attached to the belt 56.

A calculator 100 in FIG. 1 calculates the tension of the belt 56 based on the measured natural frequency of the vibrating belt 56 in FIG. 2. The calculator 100 further calculates the appropriate natural frequency of the belt corresponding to a target tension of the belt when the belt tension is adjusted, and also displays the unit mass of the belt and the recommended tension thereof. In other words, the calculator 100 operates as, for example, a belt tension calculator and a belt natural frequency calculator.

The calculator 100 in FIG. 1 includes a processor 12, a memory 14, a touch screen 16, a transmitter/receiver 22, and an interface 24. The processor 12 transmits and receives data through, for example, the transmitter/receiver 22 or the interface 24. The transmitter/receiver 22 wirelessly transmits and receives data to and from an external network such as a mobile phone network 82. The interface 24 transmits and receives data to and from an external device such as a personal computer (PC) 86 via a communications link through wires. The communications link is, for example, a universal serial bus (USB). The PC 86 is connected to a local area network (LAN) 83. The transmitter/receiver 22 may wirelessly transmit and receive data to and from the LAN 83.

The mobile phone network 82 and the LAN 83 are connected to a wide area network (WAN) such as the Internet 84. The transmitter/receiver 22 or the interface 24 is connected to a predetermined server 88 through, for example, the Internet 84. The processor 12 downloads, for example, a program and other calculation data from the server 88 to store, in advance, the program and the data in the memory 14.

Examples of the calculation data include the unit mass of the belt, the recommended tension thereof, a correction expression for correcting a theoretical expression, and the range within which the correction expression is applicable. The unit mass, the recommended tension, the correction expression, and the range within which the correction expression is applicable are prepared for each kind or each type of belt. The program includes a theoretical expression representing the relationship between the natural frequency and the tension. The calculation data, for example, may be incorporated into the program.

The processor 12 loads the program from the memory 14 to run the program. The processor 12 outputs image data to be displayed to the touch screen 16. The touch screen 16 includes a display, and a touch sensor panel serving as an input device. Examples of the display may include a liquid crystal display, and a display including organic electroluminescence (EL) devices (referred to also as organic light-emitting diodes). The touch sensor panel has a touch-sensitive surface, and may be substantially transparent. The touch sensor panel covers at least a portion of the screen of the display. The touch screen 16 displays an image in accordance with data output from the processor 12. A user touches the surface of the touch screen 16 to enter data (for example, the natural frequency of the belt and a span). The touch screen 16 outputs the entered data to the processor 12. The processor 12 performs a predetermined calculation based on the entered data, and outputs the calculation result to the touch screen 16. The touch screen 16 displays the calculation result.

As such, the calculator 100 has a constituent portion serving as a computer to run the program. The program allows the calculator 100 to execute at least part of a process described below. Typical examples of the calculator 100 may include a smartphone (an advanced mobile phone), a tablet PC, and any other PCs.

Figure 3:
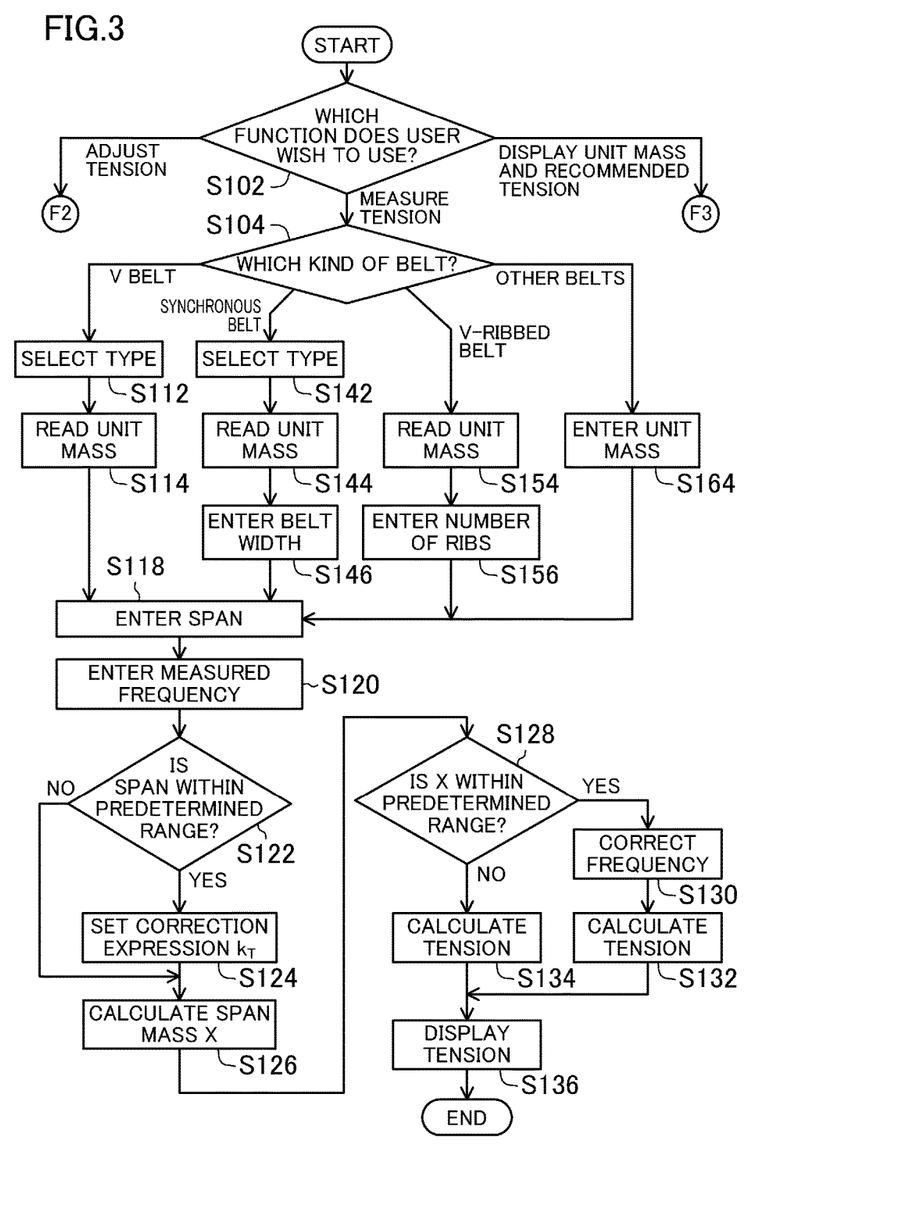
FIG. 3 is a flowchart illustrating an example of a process flow in the calculator of FIG. 1.

FIG. 3 is a flowchart illustrating an example of a process flow in the calculator 100 of FIG. 1. Processes in the following flowcharts are performed, for example, by allowing the processor 12 to run the program loaded from the memory 14. In block S102, the processor 12 displays a message asking the user a question on the touch screen 16. The message displayed on the touch screen 16 asks a question as to which of the following functions the user wishes to use: measuring the tension, adjusting the belt tension, or displaying the belt unit mass and the recommended tension. The user touches the touch screen 16 to select one of the functions. The processor 12 receives the user's choice from the touch screen 16. When the user has selected the function of measuring the tension, the process proceeds to block S104. When the user has selected the function of tensioning the belt, the process proceeds to F2. When the user has selected the function of displaying the belt unit mass and the recommended tension, the process proceeds to F3.

In block S104, the processor 12 displays, on the touch screen 16, a message asking the user a question about the kind of the belt. Examples of the kind of the belt include a V belt, a V-ribbed belt, a synchronous belt, and other kinds. The user touches the touch screen 16 to select the kind of the belt. The processor 12 receives the user's choice from the touch screen 16. When the user has selected the V belt, the process proceeds to block S112. When the user has selected the synchronous belt, the process proceeds to block S142. When the user has selected the V-ribbed belt, the process proceeds to block S154. When the user has selected other kinds of belts, the process proceeds to block S164.

When the user has selected the V belt, the processor 12 displays, on the touch screen 16, a message asking the user a question about the type of the V belt in block S112. The user touches the touch screen 16 to select the type of the belt. The processor 12 receives the user's choice from the touch screen 16. In block S114, the processor 12 reads the unit mass μ [kg/m] of the selected type of the belt from the memory 14.

In block S118, the processor 12 displays, on the touch screen 16, a message asking the user a question about the span L [m]. The user touches the touch screen 16 to enter the span L. The touch screen 16 receives the span L, and the processor 12 receives the entered span L from the touch screen 16.

In block S120, the processor 12 displays, on the touch screen 16, a message asking the user a question about the natural frequency of the belt. The user taps the belt 56 looped over the pulleys 52 and 54 as illustrated in FIG. 2 with, for example, a hammer, and measures the natural frequency of the belt 56 using, for example, the output of the acceleration sensor 57 attached to the belt 56. At this time, sound produced by the belt 56 may be received by a sensor, such as a microphone, and the natural frequency may be measured based on the output of the sensor. The acceleration sensor 57 may be a one-dimensional or two-dimensional acceleration sensor. The user touches the touch screen 16 to enter the natural frequency $f_m$ [Hz] measured outside the calculator 100 using the sensor as above. The touch screen 16 receives the natural frequency $f_m$, and the processor 12 receives the entered natural frequency $f_m$ from the touch screen 16.

In block S122, the processor 12 reads information indicating a predetermined span range from, for example, the memory 14. The predetermined span range corresponds to the target belt to be measured, and is set for each kind of belt and each type of belt. The processor 12 determines whether or not the entered span is within such a predetermined range. In a case where the span is within the predetermined span range, the process proceeds to block S124, and in other cases, the process proceeds to block S126.

In block S124, the processor 12 reads the coefficients of a tension correction expression $k_T$ from the memory 14 in accordance with the kind and type of the belt to set the coefficient. The tension correction expression $k_T$ is used to correct a predetermined expression so that the error caused by the belt bending stiffness is reduced. While the tension correction expression $k_T$ is, for example, a linear expression of the span, the tension correction expression $k_T$ may be an expression of a different type. The tension correction expression $k_T$ may vary depending on the kind and type of the belt. In block S124, the processor 12 may read the tension correction expression $k_T$ from the memory 14 in accordance with the kind and type of the belt. In such a case, the predetermined span range in block S122 depends on the kind and type of the belt.

The predetermined span range in block S122 shows the range within which the correction expression is applicable. When the entered span is outside the predetermined span range, and the process in block S124 is not performed, the process proceeds assuming that the value $k_T$ is equal to one. The tension correction expression $k_T$ will be described below.

In block S126, the processor 12 calculates a span mass X based on the following expression.

$$X = \mu L \quad \text{(Expression 1)}$$

In block S128, the processor 12 determines whether the span mass X is within a predetermined range. In a case where the span mass X is within the predetermined range, the process proceeds to block S130. In other cases, the process proceeds to block S134.

When the natural frequency of the belt 56 is measured using the output of the acceleration sensor 57 attached to the belt 56, the measured natural frequency $f_m$ is sometimes affected by the mass of the acceleration sensor 57. To address this problem, the measured natural frequency $f_m$ may be corrected by a frequency correction expression $k_f$ that reduces the influence of the mass of the acceleration sensor 57, and the correction result may be used as the natural frequency. In block S130, to reduce the influence of the mass of the acceleration sensor 57, the processor 12 corrects the measured natural frequency $f_m$ by, for example, the following expression.

$$f_a = k_f f_m \quad \text{(Expression 2)}$$

The frequency correction expression $k_f$ may be unchanged independently of the kind and type of the belt, or may be set for each kind or type of belt or for each sensor mass of the acceleration sensor 57. When the frequency correction expression $k_f$ is set for each kind or type of belt or for each sensor mass, the processor 12 reads the frequency correction expression $k_f$ corresponding to the belt 56 and the sensor mass from the memory 14, for example, in block S130. In such a case, the predetermined range in block S128 depends on the kind and type of the belt and the sensor mass. When the influence of the mass of the acceleration sensor 57 is not considered, the frequency correction expression $k_f$ is equal to one. The same applies hereafter. The frequency correction expression $k_f$ will be described below.

In block S132, the processor 12 calculates the belt tension using a predetermined expression for V belts. The calculation of the belt tension will be described. Typically, the relationship among the belt tension $T_0$ [N], the belt unit mass the span L, and the natural frequency f [Hz] is represented by the following expression.

$$f = 1/(2L) \cdot (T_0/\mu)^{1/2} \quad \text{(Expression 3)}$$

The modification of this expression leads to the following theoretical expression for determining the tension based on the natural frequency.

$$T_0 = 4\mu L^2 f^2 \quad \text{(Expression 4)}$$

In block S132, the processor 12 corrects the expression 4 so that the error caused by the belt bending stiffness is reduced, and calculates the belt tension. Specifically, the processor 12 calculates the belt tension T using the following expression obtained by multiplying the tension $T_0$ determined by the expression 4 by the tension correction expression $k_T$ corresponding to the belt 56.

$$T = 4\mu L^2 f_a^2 k_T \quad \text{(Expression 5)}$$

Here, the corrected natural frequency $f_a$ is used as the natural frequency f.

Also in block S134, as in block S132, the processor 12 calculates the belt tension using the predetermined expression for V belts so that the error caused by the belt bending stiffness is reduced. Here, the processor 12 calculates the belt tension T from the following expression using the measured natural frequency $f_m$.

$$T = 4\mu L^2 f_m^2 k_T \quad \text{(Expression 6)}$$

As such, the expressions 5 and 6 are corrected by multiplying the tension correction expression $k_T$ corresponding to the belt 56.

In blocks S132 and S134, the processor 12 may determine the tension $T_1$ obtained by increasing the calculated tension T by a predetermined percentage or the tension $T_2$ obtained by decreasing the calculated tension T by a predetermined percentage. For example, when a measurement error of about 10% is expected, the processor 12 may further determine the tension $T_1$ and/or the tension $T_2$ based on the following expressions.

$$T_1 = 1.1 T$$

$$T_2 = 0.9 T$$

The processor 12 may further determine the natural frequencies corresponding to the tensions $T_1$ and $T_2$.

In block S136, the processor 12 outputs, for example, the tension T determined in block S132 or S134 and the measured natural frequency $f_m$ to the touch screen 16 to display the output values. The touch screen 16 displays, for example, the tensions T, $T_1$, and $T_2$, the measured natural frequency $f_m$, and the natural frequencies corresponding to the tensions $T_1$ and $T_2$.

Figure 4:
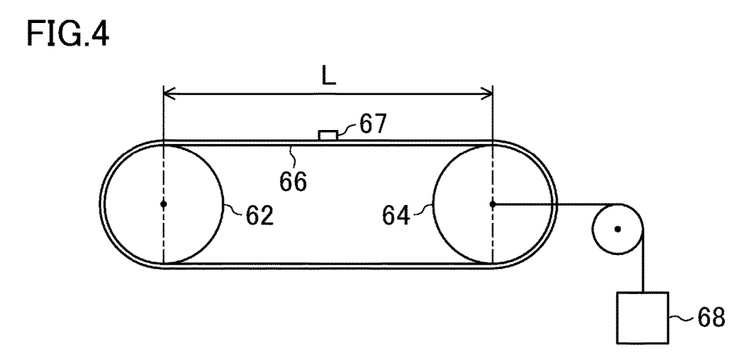
FIG. 4 illustrates an example of a measurement device for determining the relationship between the tension and natural frequency of the belt.

The tension correction expression $k_T$ and a process for determining the tension correction expression $k_T$ will be described. FIG. 4 is a diagram illustrating an example of a measurement device for determining the relationship between the tension and natural frequency of the belt. A belt 66 is looped between the pulleys 62 and 64. The span L can be freely set. A shaft of the pulley 64 is movable, and the force of gravity of a weight 68 is applied to the shaft of the pulley 64 in a direction away from the pulley 62. The force applied to the shaft of the pulley 64 may be measured using, for example, a load cell. For example, a three-dimensional acceleration sensor 67 is attached to the belt 66. The device in FIG. 4, which is used for various tests for belts, allows the span L to be several meters. The state in which the belt 66 is used are close to the state in which a belt is actually used, and a more accurate correction expression can be, therefore, determined.

In such a state, the belt 66 is tapped with a hammer or any other tool, and the natural frequency of the belt 66 is measured based on the output of, for example, the acceleration sensor 67. Sound produced by the belt 66 may be received by a sensor, such as a microphone, and the natural frequency may be measured based on the output of the sensor. Processing is performed using the measured frequency in accordance with the flow in FIG. 3 to calculate the tension. In this case, the values of the correction expressions $k_T$ and $k_f$ are fixed at one. The tensions for some different spans are similarly calculated.

Figure 5:
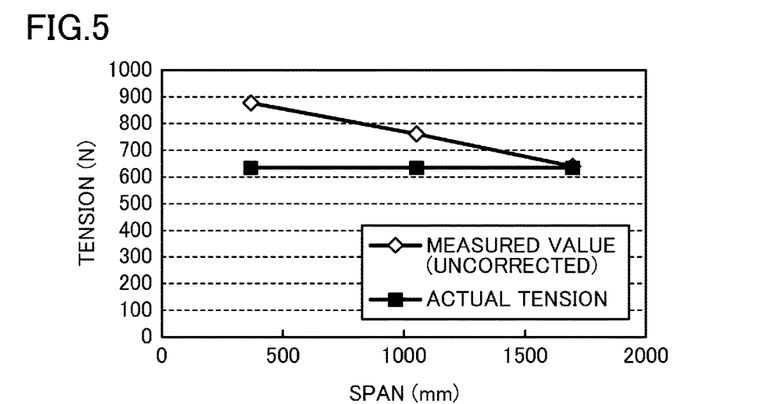
FIG. 5 is a graph illustrating an example of the relationship between the span of a V belt of one type and the measured tension thereof.

FIG. 5 is a graph illustrating an example of the relationship between the span of a V belt of one type and the measured tension thereof. While the actual tension is constant, the measured tension varies. In other words, FIG. 5 shows that the error in tension varies depending on the span.

Figure 6:
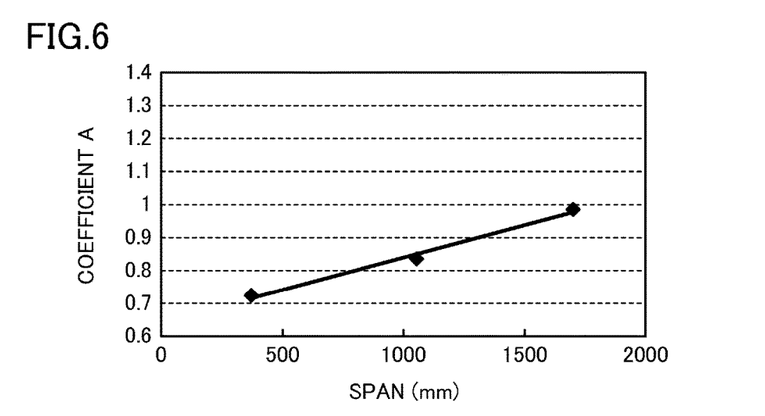
FIG. 6 is a graph illustrating an example of the relationship between the span and a coefficient A and corresponding to the graph illustrated in FIG. 5.

FIG. 6 is a graph illustrating an example of the relationship between the span and a coefficient A and corresponding to the graph illustrated in FIG. 5. The ratio of each measured tension to the corresponding actual tension is determined. FIG. 6 illustrates the inverse of the determined ratio in the form of the coefficient A. In other words, if the measured tension is multiplied by the coefficient A, the accurate tension is determined. Here, the relationship between the span L [m] and the coefficient A in FIG. 6 is approximated by a linear function using, for example, a least-squares method. This shows that the coefficient A is obtained by the following expression.

$$A = 0.20L + 0.644$$

Thus, in the case of the belt used here in the measurement, the following expression is used as the tension correction expression in blocks S132 and S134 in FIG. 3.

$$k_T = 0.20L + 0.644$$

A typical tendency to increase the error in tension with decreasing span, and FIG. 5 show that this expression is applicable within the span range of less than or equal to 1700 mm. For this reason, in the case of the belt used here in the measurement, a determination is made whether or not the span is less than or equal to 1700 mm in block S122 in FIG. 3. Likewise, the correction expressions for belts of other kinds and other types and the range within which each correction expression is applicable are determined, and the determined expressions and ranges are stored in the memory 14, or are incorporated into the program. The generalized tension correction expression $k_T$, which is a linear expression of the span L, is illustrated as follows:

$$k_T = aL + b \quad \text{(Expression 7)}$$

where a and b represent real constants.

Only in the case of some kinds and some types of belts, correction may be performed using the tension correction expression $k_T$. For example, in the case of all types of V belts and some types of synchronous belts, the expression 7 may be used as the tension correction expression $k_T$, and in the case of the other belts, the value $k_T$ may be equal to one.

Figure 7:
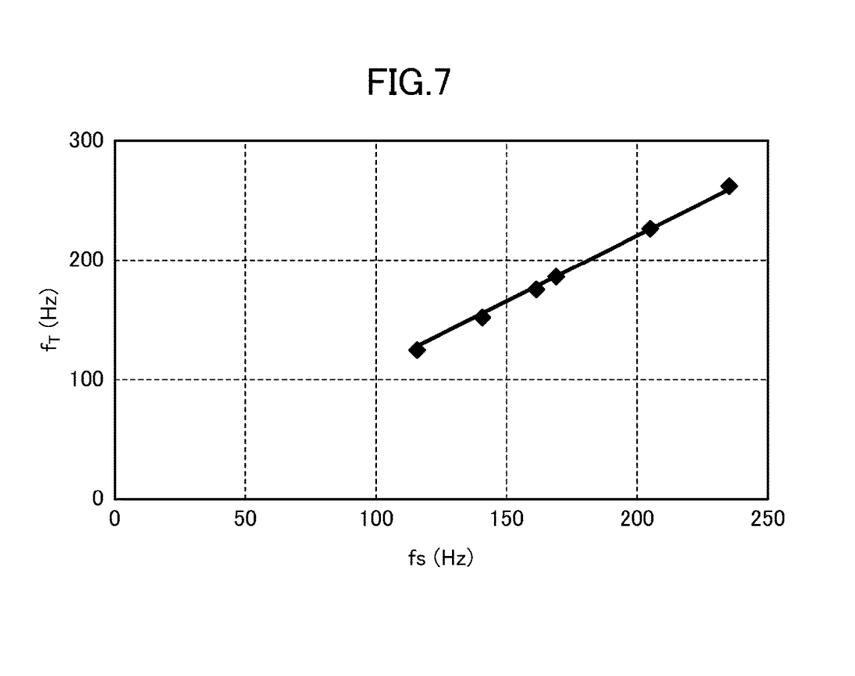
FIG. 7 is a graph illustrating an example of the relationship between the natural frequency $f_S$ of a belt determined to reflect the mass of an acceleration sensor and the theoretical natural frequency $f_T$ of the belt.

Next, the frequency correction expression $k_f$ will be described. FIG. 7 is a graph illustrating an example of the relationship between the natural frequency $f_S$ of the belt determined by considering the mass of the acceleration sensor 57 and the theoretical natural frequency $f_T$ of the belt. The theoretical natural frequency $f_T$ has been determined without considering the mass of the acceleration sensor 57. The natural frequency $f_S$ of the belt has been determined by a finite element method using a three-dimensional beam element model. In this case, the density of a portion of the belt to which the acceleration sensor 57 is attached has been increased by an amount corresponding to the mass of the sensor. FIG. 7 shows the result obtained by varying the span and the tension in a case where the sensor mass is 2 g and the unit mass of the belt is 54 g/m.

The following relationship between the natural frequency $f_S$ and the natural frequency $f_T$ is substantially obtained using the least-squares method.

$$f_T = B f_S$$

In FIG. 7, the coefficient B is 1.1027. The coefficients B of belts each having a different unit mass are similarly determined by calculation.

Figure 8:
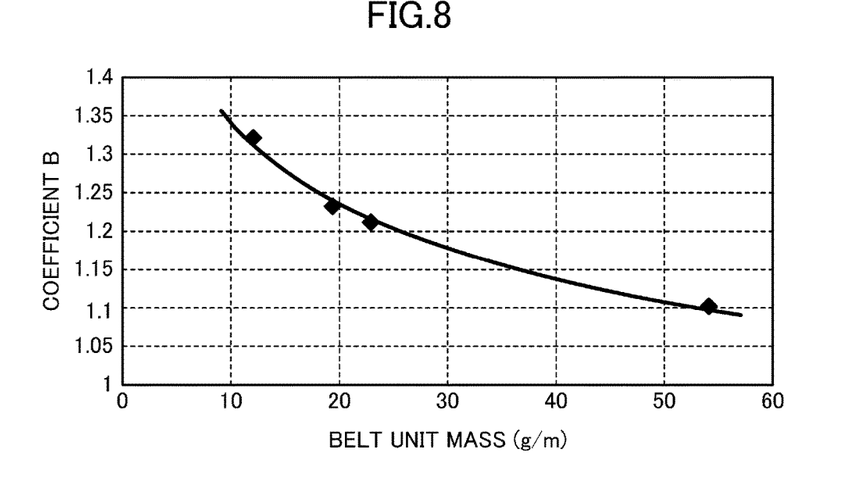
FIG. 8 is a graph illustrating an example of the relationship between the unit mass of the belt and a coefficient B.

FIG. 8 is a graph illustrating an example of the relationship between the unit mass of the belt and the coefficient B. Here, the relationship between the unit mass μ and the coefficient B in FIG. 8 is approximated by an exponential function using, for example, the least-squares method. This shows that the coefficient B is obtained by the following expression.

$$B = 1.76\mu^{-0.12}$$

Thus, in the case of the belt used here in the measurement, the following expression is used as the frequency correction expression in blocks S132 and S134 in FIG. 3.

$$k_f = 1.76\mu^{-0.12}$$

Analysis by a response surface methodology has showed that in a case where the sensor mass is, for example, 2 g, and the span mass of the belt is greater than about 60 g, the error between the natural frequency $f_S$ and the natural frequency $f_T$ falls within about 3% independently of the span and the tension. Thus, the correction expression may be applied only to cases where the span mass is less than 60 g. In this case, in block S128, the processor 12 determines whether or not the span mass X is less than 60 g. The correction expressions of belts of other kinds and other types and the range within which each correction expression is applicable may be similarly determined, and the determined expressions and range may be stored in the memory 14, or may be incorporated into the program. Furthermore, the correction expressions of other sensor masses and the range within which each correction expression is applicable may be similarly determined. The generalized frequency correction expression $k_f$, which is an exponential function of the unit mass $\mu$ of the belt, is illustrated as follows:

$$k_f = c\mu^d \quad \text{(Expression 8)}$$

where c and d represent constants.

FIG. 3 will be referred to again. When the user has selected a synchronous belt, the processor 12 displays a message asking the user a question about the type of the synchronous belt on the touch screen 16 in block S142. The user touches the touch screen 16 to select the belt type. The processor 12 receives the user's choice from the touch screen 16. In block S144, the processor 12 reads the unit mass a [kg/m²] of the selected belt from the memory 14.

In block S146, the processor 12 displays a message asking the user a question about the belt width on the touch screen 16. The user touches the touch screen 16 to enter the belt width. The processor 12 receives the entered belt width W [m] from the touch screen 16.

In the case of the synchronous belt, the processor 12 calculates the belt tension using a predetermined expression for synchronous belts in blocks S132 and S134. In other words, the product of the unit mass a and the belt width W is used instead of the unit mass $\mu$ in the expressions 5 and 6. Specifically, the following expressions 9 and 10 are respectively used instead of the expressions 5 and 6 to calculate the tension.

$$T = 4\sigma W L^2 f_a^2 k_T \quad \text{(Expression 9)}$$

$$T = 4\sigma W L^2 f_m^2 k_T \quad \text{(Expression 10)}$$

The other processes are similar to those for the V belt.

When the user has selected a V-ribbed belt, the processor 12 reads the unit mass $\mu_r$ [kg/m] (the mass of one rib per unit length) of the V-ribbed belt from the memory 14 in block S154.

In block S156, the processor 12 displays a message asking the user a question about the number of ribs of the belt on the touch screen 16. The user touches the touch screen 16 to enter the number of the ribs. The processor 12 receives the entered number n of the ribs from the touch screen 16.

In the case of the V-ribbed belt, the processor 12 calculates the belt tension using a predetermined expression for V-ribbed belts in blocks S132 and S134. In other words, the product of the unit mass $\mu_r$ and the number n of the ribs is used instead of the unit mass $\mu$ in the expressions 5 and 6. Specifically, the following expressions 11 and 12 are respectively used instead of the expressions 5 and 6 to calculate the tension.

$$T = 4n\mu_r L^2 f_a^2 k_T \quad \text{(Expression 11)}$$

$$T = 4n\mu_r L^2 f_m^2 k_T \quad \text{(Expression 12)}$$

The other processes are similar to those for the V belt.

When the user has selected other kinds of belts, the processor 12 displays a message asking the user a question about the unit mass of the belt on the touch screen 16 in block S164. The user touches the touch screen 16 to enter the unit mass. The processor 12 receives the entered unit mass $\mu$ [kg/m] from the touch screen 16. In blocks S132 and S134, the correction expression $k_T$ is equal to, for example, one. The other processes are similar to those for the V belt.

As such, the calculator 100 of FIG. 1, which receives the natural frequency of the belt, can determine the belt tension independently of a process for measuring the natural frequency. In a case where the span is within a predetermined range corresponding to the belt, the tension correction expression corresponding to the belt reduces the error caused by the belt bending stiffness. In a case where the span mass is within a predetermined range corresponding to the belt, the frequency correction expression corresponding to the belt reduces the influence of the mass of the sensor for use in the measurement of the natural frequency. This enables the determination of a more accurate tension of the belt. In a case where the span and the span mass are outside corresponding predetermined ranges, no unnecessary correction is performed.

Figure 9:
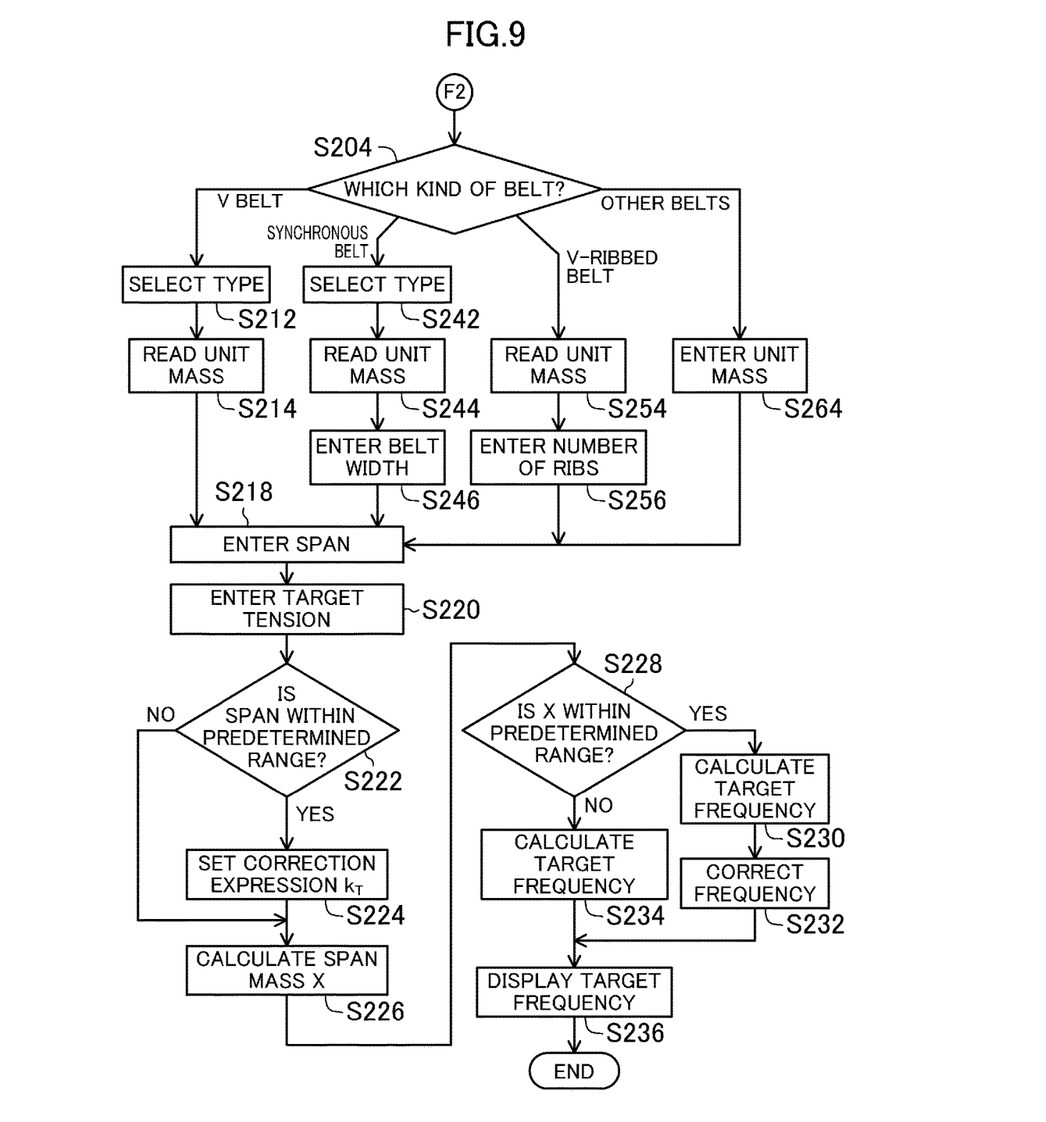
FIG. 9 is a flowchart illustrating an example of a process flow for tensioning the belt in the calculator of FIG. 1.

FIG. 9 is a flowchart illustrating an example of a process flow of tensioning the belt in the calculator 100 of FIG. 1. In tensioning the belt, the natural frequency corresponding to the target tension (i.e., the target natural frequency) is determined. A process in block S204 is substantially similar to that in block S104. When the user has selected a V belt, the process proceeds to block S212. When the user has selected a synchronous belt, the process proceeds to block S242. When the user has selected a V-ribbed belt, the process proceeds to block S254. When the user has selected other kinds of belts, the process proceeds to block S264.

The case where the user has selected the V belt will be described. A process in block S212, a process in block S214, and a process in block S218 are respectively similar to that in block S112, that in block S114, and that in block S118 in FIG. 3.

In block S220, the processor 12 displays a message asking the user a question about the target tension T [N] of the belt on the touch screen 16. The user touches the touch screen 16 to enter the target tension T. The touch screen 16 receives the target tension T, and the processor 12 receives the entered target tension T from the touch screen 16. A process in block S222, a process in block S224, and a process in block S226 are respectively similar to that in block S122, that in block S124, and that in block S126 in FIG. 3. When processing in block S224 is not performed, the process proceeds assuming that the value $k_T$ is equal to one. In block S228, the processor 12 determines whether or not the span mass X is within a predetermined range. In a case where the span mass X is within the predetermined range, the process proceeds to block S230. In other cases, the process proceeds to block S234.

In block S230, the processor 12 calculates the natural frequency corresponding to the target tension of the belt (i.e., the target natural frequency). The modification of the expression 5 for V belts leads to the following expression.

$$f_a=1/(2L)\cdot(T/\mu k_T)^{1/2} \quad \text{(Expression 13)}$$

In block S230, the processor 12 calculates the target natural frequency of the belt 56 using the expression 13.

In block S232, the processor 12 corrects the determined natural frequency so that the influence of the mass of the acceleration sensor 57, which is attached to the belt 56 to measure the natural frequency, is reduced. Specifically, the processor 12 determines the target natural frequency $f_m$ by correcting the determined frequency $f_a$ using the following expression.

$$f_m=f_a/k_f \quad \text{(Expression 14)}$$

This expression is determined based on the expression 2 described above.

The modification of the expression 6 for V belts leads to the following expression.

$$f_m=1/(2L)\cdot(T/\mu k_T)^{1/2} \quad \text{(Expression 15)}$$

In block S234, the processor 12 calculates the target natural frequency of the belt 56 using the expression 15. The expressions 13 and 15 have been obtained by correcting the expression 3 determining the natural frequency so that the error caused by the belt bending stiffness is reduced. This correction is performed by dividing the expression 6 by the square root of the tension correction expression $k_T$ corresponding to the belt 56.

In blocks S230 and S234, the processor 12 may determine the target natural frequency $f_1$ obtained by increasing the determined target natural frequency $f_m$ by a predetermined percentage or the target natural frequency $f_2$ obtained by decreasing the determined target natural frequency $f_m$ by a predetermined percentage. For example, when a measurement error of about 10% is expected, the processor 12 may further determine the target natural frequency $f_1$ and/or the target natural frequency $f_2$ based on the following expressions.

$$f_1=1.1 f_m$$

$$f_2=0.9 f_m$$

The processor 12 may further determine tensions corresponding to the target natural frequencies $f_1$ and $f_2$.

In block S236, the processor 12 outputs, for example, the target natural frequency $f_m$ determined in block S230 or S234 and the entered target tension to the touch screen 16 to display the target natural frequency $f_m$ and the target tension thereon. The touch screen 16 displays, for example, the target natural frequencies $f$, $f_1$, and $f_2$, the entered target tension, and the tensions corresponding to the target natural frequencies $f_1$ and $f_2$. Thereafter, the user attaches, for example, the acceleration sensor 57 to the belt 56 to measure the natural frequency, and the belt tension is adjusted such that the natural frequency is equal to, for example, the target natural frequency f. This allows the belt tension to be substantially equal to the target tension.

The case where the user has selected the synchronous belt will be described. A process in block S242, a process in block S244, and a process in block S246 are respectively similar to that in block S142, that in block S144, and that in block S146 in FIG. 3.

In the case of the synchronous belt, the processor 12 calculates the target natural frequency using a predetermined expression for synchronous belts in blocks S230 and S234. Specifically, the following expressions 16 and 17 are respectively used instead of the expressions 13 and 15 to calculate the target natural frequency.

$$f_a=1/(2L)\cdot(T/\sigma W k_T)^{1/2} \quad \text{(Expression 16)}$$

$$f_m=1/(2L)\cdot(T/\sigma W k_T)^{1/2} \quad \text{(Expression 17)}$$

The expression 16 is obtained by modifying the expression 9, and the expression 17 is obtained by modifying the expression 10. The other processes are similar to those for the V belt.

The case where the user has selected the V-ribbed belt will be described. A process in block S254 and a process in block S256 are respectively similar to that in block S154 and that in block S156 in FIG. 3.

In the case of the V-ribbed belt, the processor 12 calculates the target natural frequency using a predetermined expression for V-ribbed belts in blocks S230 and S234. Specifically, the following expressions 18 and 19 are respectively used instead of the expressions 13 and 15 to calculate the target natural frequency.

$$f_a=1/(2L)\cdot(T/n\mu_r k_T)^{1/2} \quad \text{(Expression 18)}$$

$$f_m=1/(2L)\cdot(T/\mu_r k_T)^{1/2} \quad \text{(Expression 19)}$$

The expression 18 is obtained by modifying the expression 11, and the expression 19 is obtained by modifying the expression 12. The other processes are similar to those for the V belt.

The case where the user has selected other kinds of belts will be described. A process in block S264 is similar to that in block S164 in FIG. 3. In blocks S230 and S234, the correction expression $k_T$ is equal to, for example, one. The other processes are similar to those for the V belt.

As such, the calculator 100 of FIG. 1 enables the determination of the target natural frequency corresponding to the target tension of the belt based on the target tension. The user adjusts the belt tension such that the natural frequency of the belt is equal to the target natural frequency, while measuring the natural frequency of the belt. This allows the belt tension to be adjusted to the target tension.

In a case where the span is within a predetermined range corresponding to the belt, the tension correction expression corresponding to the belt reduces the error caused by the belt bending stiffness. In a case where the span mass is within a predetermined range corresponding to the belt, the frequency correction expression corresponding to the belt reduces the influence of the mass of the sensor for use in the measurement of the natural frequency. This enables the determination of a more accurate target natural frequency of the belt. In a case where the span and the span mass are outside the corresponding predetermined ranges, no unnecessary correction is performed.

Figure 10:
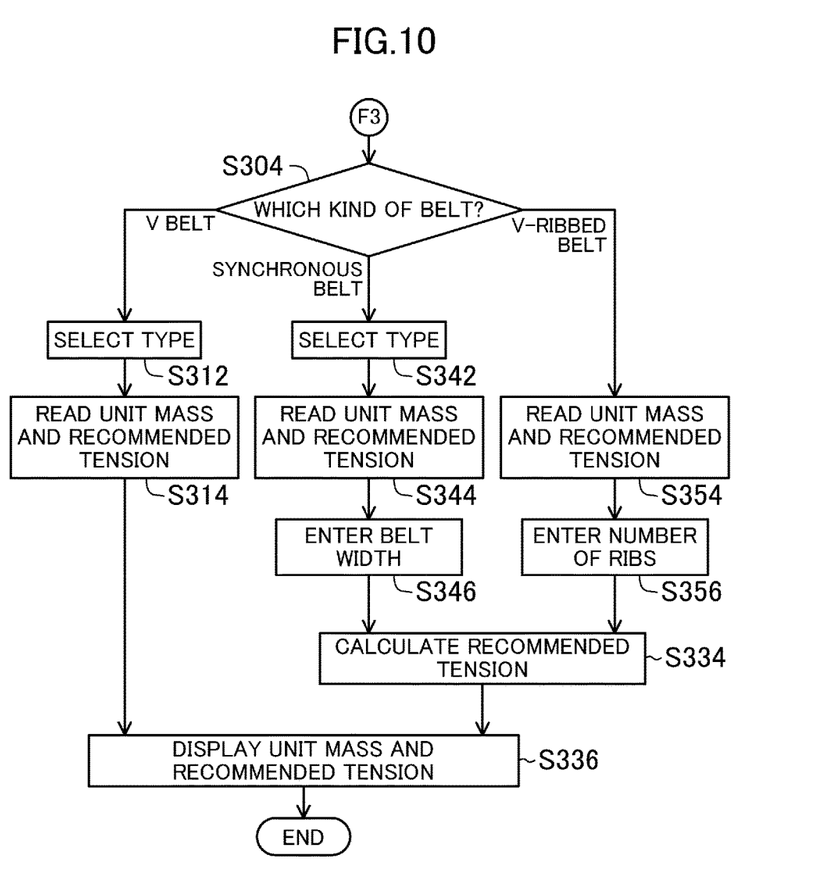
FIG. 10 is a flowchart illustrating an example of a process flow for displaying the unit mass and recommended tension of the belt in the calculator of FIG. 1.

FIG. 10 is a flowchart illustrating an example of a process flow of displaying the belt unit mass and the recommended belt tension in the calculator 100 of FIG. 1. In block S304, the processor 12 displays a message asking the user a question about the kind of the belt on the touch screen 16. Examples of the kind of the belt include a V belt, a V-ribbed belt, and a synchronous belt. The user touches the touch screen 16 to select the kind of the belt. The processor 12 receives the user's choice from the touch screen 16. When the user has selected the V belt, the process proceeds to block S312. When the user has selected the synchronous belt, the process proceeds to block S342. When the user has selected the V-ribbed belt, the process proceeds to block S354.

The case where the user has selected the V belt will be described. A process in block S312 is similar to that in block S112 in FIG. 3. In block S314, the processor 12 reads the unit mass of the selected belt and the recommended tension thereof from the memory 14. In block S336, the processor 12 outputs the read unit mass and the read recommended tension to the touch screen 16. The touch screen 16 displays the unit mass and the recommended tension.

The case where the user has selected the synchronous belt will be described. A process in block S342 and a process in block S346 are respectively similar to that in block S142 and that in block S146 in FIG. 3. In block S344, the processor 12 reads the unit mass of the selected belt and the recommended tension thereof per unit width from the memory 14. In block S334, the processor 12 multiplies the recommended tension per unit width by the belt width to determine the recommended tension. A process in block S336 is similar to that for the V belt.

The case where the user has selected the V-ribbed belt will be described. In block S354, the processor 12 reads the unit mass of the belt and the recommended tension thereof per rib from the memory 14. A process in block S356 is similar to that in block S156 in FIG. 3. In block S334, the processor 12 multiplies the recommended tension per rib by the number of ribs to determine the recommended tension. A process in step S336 is similar to that for the V belt.

As such, the calculator 100 of FIG. 1 allows the user to know the unit mass and recommended tension of the belt without referring to, for example, data for designing.

Each functional block herein can be typically implemented by hardware. For example, each functional block may be implemented on a semiconductor substrate as a part of an integrated circuit (IC). Here, examples of the IC includes a large-scale integrated circuit (LSI), an application-specific integrated circuit (ASIC), a gate array, and a field programmable gate array (FPGA). Alternatively, a part or the entire part of each functional block may be implemented by software. For example, such a functional block may be implemented by a processor and a program that can be executed on the processor. In other words, each functional block herein may be implemented by hardware, software, or any combination of hardware and software.

When the above-described process is implemented by software, microcodes, assembly language codes, or higher-level language codes, for example, can be used. The codes can be stored in one or more volatile or nonvolatile non-transitory computer-readable storage media. Examples of the non-transitory computer-readable storage media include random access memories (RAMs), read only memories (ROMs), electrically erasable programmable read only memories (EEPROMs), flash memories, magnetic storage media, and optical storage media. Embodiments within the scope of the present invention may also include such non-transitory computer-readable storage media.

The many features and advantages of the present invention are apparent from the written description, and thus, it is intended by the appended claims to cover all such features and advantages of the present invention. Further, since numerous modifications and changes will readily occur to those skilled in the art, it is not desired to limit the invention to the exact construction and operation shown and described, and accordingly, all suitable modifications and equivalents which may be resorted to are intended to fall within the scope of the invention.

As described above, the embodiment of the present invention enables the determination of the belt tension without depending on a process for measuring the natural frequency. Thus, the present invention is useful, for example, for a method and a device for calculating the belt tension, a method and a device for calculating the belt natural frequency, and a non-transitory computer-readable storage medium containing instructions which performs one of the methods.

What is claimed is:

1. A non-transitory computer-readable storage medium containing instructions which, when executed by one or more processors, performs a method for calculating a belt tension, the method comprising:
receiving a natural frequency of a belt tensioned between pulleys, determined based on an output of a sensor, which is attached to the belt for sensing an acceleration of the belt or senses a sound generated by the belt, and a span, wherein the span is a distance between contact points of the pulleys with the belt;
performing calculation for determining a tension of the belt using a predetermined expression, based on the natural frequency, the span, and a unit mass of the belt read from a memory; and
displaying the determined tension on a display, wherein
in a case where the span is within a predetermined range corresponding to the belt, the predetermined expression is corrected by being multiplied by a correction expression, which corresponds to the belt and is a function of the span, thereby reducing an error caused by a bending stiffness of the belt.

2. The non-transitory computer-readable storage medium of claim 1, wherein the correction expression is a linear expression of the span.

3. The non-transitory computer-readable storage medium of claim 1, wherein:
the sensor is attached to the belt; and
the natural frequency for use in the calculation for determining the tension is corrected, thereby reducing an influence of a mass of the sensor.

4. The non-transitory computer-readable storage medium of claim 1, wherein the method further comprising:
determining a value obtained by increasing or decreasing the tension by a predetermined percentage; and
displaying the value on the display.

5. A non-transitory computer-readable storage medium containing instructions which, when executed by one or more processors, performs a method for calculating a belt natural frequency, the method comprising:
receiving a target tension of a belt tensioned between pulleys and a span, wherein the span is a distance between contact points of the pulleys with the belt;
performing calculation for determining a target natural frequency of the belt using a predetermined expression, based on the target tension, the span, and a unit mass of the belt read from a memory; and
displaying the determined target natural frequency on a display such that a natural frequency of the belt is adjusted to correspond to the determined target natural frequency where the natural frequency is determined based on an output of a sensor, which is attached to the belt for sensing an acceleration of the belt or senses a sound generated by the belt, wherein
in a case where the span is within a predetermined range corresponding to the belt, the predetermined expression is corrected by being divided by a correction expression, which corresponds to the belt and is a function of the span, thereby reducing an error caused by a bending stiffness of the belt.

6. The non-transitory computer-readable storage medium of claim 5, wherein the correction expression is a square root of a linear expression of the span.

7. The non-transitory computer-readable storage medium of claim 5, wherein:
the sensor is attached to the belt; and
in the calculation for determining the target natural frequency, the determined target natural frequency is corrected, thereby reducing an influence of a mass of the sensor.

8. The non-transitory computer-readable storage medium of claim 5 wherein the method further comprising:
determining a value obtained by increasing or decreasing the target natural frequency by a predetermined percentage; and
displaying the value on the display.

9. A method for calculating a belt tension, the method comprising:
receiving a natural frequency of a belt tensioned between pulleys, determined based on an output of a sensor, which is attached to the belt for sensing an acceleration of the belt or senses a sound generated by the belt, and a span, wherein the span is a distance between contact points of the pulleys with the belt;
performing calculation for determining a tension of the belt using a predetermined expression, based on the natural frequency, the span, and a unit mass of the belt read from a memory; and
displaying the determined tension on a display, wherein
in a case where the span is within a predetermined range corresponding to the belt, the predetermined expression is corrected by being multiplied by a correction expression, which corresponds to the belt and is a function of the span, thereby reducing an error caused by a bending stiffness of the belt.

10. A method for calculating a belt natural frequency, the method comprising:
receiving a target tension of a belt tensioned between pulleys and a span, wherein the span is a distance between contact points of the pulleys with the belt;
performing calculation for determining a target natural frequency of the belt using a predetermined expression, based on the target tension, the span, and a unit mass of the belt read from a memory; and
displaying the determined target natural frequency on a display such that a natural frequency of the belt is adjusted to correspond to the determined target natural frequency where the natural frequency is determined based on an output of a sensor, which is attached to the belt for sensing an acceleration of the belt or senses a sound generated by the belt, wherein in a case where the span is within a predetermined range corresponding to the belt, the predetermined expression is corrected by being divided by a correction expression, which corresponds to the belt and is a function of the span, thereby reducing an error caused by a bending stiffness of the belt.

11. A display assembly including a device for calculating a belt tension, the device comprising:
a sensor which is attached to a belt tensioned between pulleys for sensing an acceleration of the belt or senses a sound generated by the belt;
an input device configured to receive a natural frequency of the belt, determined based on an output of the sensor and a span, wherein the span is a distance between contact points of the pulleys with the belt;
a memory configured to store a unit mass of the belt;
a processor configured to perform calculation for determining a tension of the belt using a predetermined expression, based on the natural frequency, the span, and the unit mass of the belt read from the memory; and
a display configured to display the determined tension, wherein
in a case where the span is within a predetermined range corresponding to the belt, the predetermined expression is corrected by being multiplied by a correction expression, which corresponds to the belt and is a function of the span, thereby reducing an error caused by a bending stiffness of the belt.

12. A display assembly including a device for calculating a belt natural frequency, the device comprising:
an input device configured to receive a target tension of a belt tensioned between pulleys and a span, wherein the span is a distance between contact points of the pulleys with the belt;
a memory configured to store a unit mass of the belt;
a processor configured to perform calculation for determining a target natural frequency of the belt using a predetermined expression, based on the target tension, the span, and the unit mass of the belt read from the memory;
a sensor which is attached to the belt for sensing an acceleration of the belt or senses a sound generated by the belt; and
a display configured to display the determined target natural frequency such that a natural frequency of the belt is adjusted to correspond to the determined target natural frequency where the natural frequency is determined based on an output of the sensor, wherein
in a case where the span is within a predetermined range corresponding to the belt, the predetermined expression is corrected by being divided by a correction expression, which corresponds to the belt and is a function of the span, thereby reducing an error caused by a bending stiffness of the belt.

* * * * *